United States Patent [19]

Anderson

[11] Patent Number: 5,690,776
[45] Date of Patent: Nov. 25, 1997

[54] BELT SPLICING SYSTEM

[75] Inventor: Ted P. Anderson, St. Peters, Mo.

[73] Assignee: Burrell Leder Beltech, Inc., Skokie, Ill.

[21] Appl. No.: 344,073

[22] Filed: Nov. 23, 1994

[51] Int. Cl.$^6$ .................................................. B65H 21/00
[52] U.S. Cl. .................................. 156/304.2; 156/304.6; 156/502; 156/507
[58] Field of Search ........................... 156/157, 304.1, 156/304.2, 304.6, 502, 507

[56] References Cited

U.S. PATENT DOCUMENTS

| | | | |
|---|---|---|---|
| 3,542,627 | 11/1970 | Osmalov et al. | 156/502 |
| 3,586,584 | 6/1971 | Wilkins | 156/502 X |
| 3,642,555 | 2/1972 | Nagoshi et al. | 156/157 X |
| 3,783,065 | 1/1974 | Stone | 156/502 X |
| 4,733,930 | 3/1988 | Severin et al. | 156/159 X |
| 4,765,862 | 8/1988 | Azuma | 156/304.1 X |
| 4,960,478 | 10/1990 | Newkirk et al. | 156/304.2 X |
| 5,241,157 | 8/1993 | Wermelinger et al. | 156/304.2 X |
| 5,397,425 | 3/1995 | Ivansons et al. | 156/304.2 X |
| 5,421,944 | 6/1995 | Davis et al. | 156/304.2 |

*Primary Examiner*—Mark A. Osele
*Attorney, Agent, or Firm*—Keck, Mahin & Cate

[57] ABSTRACT

A belt splicing tool for thermally joining first and second ends of thermoplastic belts. The tool includes a position control means and first and second clamping mechanisms cooperatively engaged and diametrically opposed along a longitudinal axis. The first clamping mechanism holds a first end section of a belt and the second clamping mechanism holds a second end section of a belt. The position control means repositions the clamping mechanisms relative to one another along the longitudinal axis between a first position where the longitudinal spacing between the clamping mechanisms is minimized, and a second position where the longitudinal spacing between the clamping mechanisms is maximized. The tool retains and aligns both belt ends in an opposed abutting relationship while permitting longitudinal movement of the belt ends relative to one another. Splicing is accomplished by (i) placing the belt end sections in the tool, (ii) melting the end portion of at least one of the belts, and (iii) holding the end portions together until the material solidifies.

12 Claims, 2 Drawing Sheets

BELT SPLICING SYSTEM

BACKGROUND OF THE INVENTION

Many production lines use conveyor belt systems to transport products and supplies through the manufacturing process. The belts used on these conveyors are typically endless thermoplastic belts which have been shaped to conform to the conveyor system under proper tension.

Replacement of a broken belt is a time consuming process which requires removal of the broken belt, locating and/or ordering the proper replacement belt, and installing the replacement belt. Maintaining an inventory of replacement belts is expensive and requires substantial storage space. Hence, manufacturing plants tend to simply maintain a base stock of the various belt types used in the plant and splice together an endless belt of the proper length from the base stock using one of the commonly available splicing tools. Alternatively, a broken belt can be repaired—rather than replaced—by splicing the belt together at the point of failure.

A common splicing technique uses metal linking clips which physically grip both ends of the belt to form an endless belt. While generally effective for creating an endless belt, the clips obtrusively protrude from the conveying surface of the belt and are prone to failure due to the significant amount of stress placed upon the end sections of the belt to which the clip is attached. A second splicing technique uses special adhesives for adhesively bonding the ends of the belt together. While this techniques provides a smooth surface across the joint, it generally requires substantial curing times, produce unwanted fumes, and frequently result in repeated failure along the bond line.

The most commonly used technique for splicing together thermoplastic belts is the weld-splicing technique. For belts with a width of less than about two inches the splicing system of choice is a weld-splicing kit available from Eagle Belting Company under the designation UT-236. Briefly, this kit includes a pair of pliers with clamps mounted at the distal end for retaining the butt-ends of the belt to be spliced, and a heating wand for melting the butt-ends of the belt. While generally effective for weld-splicing thermoplastic belts of various cross-section, this hand-tool is cumbersome to use and occasionally produces an incomplete bond due to the arcuate nature of the end-to-end abutment inherent in the operation of pliers.

Accordingly, a substantial need exists for a belt splicing tool that allows for quick, easy, reliable, and smooth splicing of belt ends with complete end-to-end contact between the belt ends for a variety of belt sizes and shapes. The tool preferably allows repair and tensioning without requiring complete removal of the belt from a conveyor system.

SUMMARY

I have discovered a belt splicing tool that allows for quick and easy splicing of thermoplastic belts. The belt splicing tool includes (i) first and second clamping mechanisms cooperatively engaged and diametrically opposed along a longitudinal axis, and (iii) a position control means for adjusting the longitudinal position of the clamping mechanisms relative to each other. The first clamping mechanism is designed to hold a first end section of a belt while the second clamping mechanism is designed to hold a second end section of a belt.

The position control means is effective for repetitively repositioning the clamping mechanisms relative to one another along a longitudinal axis between a first position and a second position wherein the first position provides a smaller longitudinal gap between the clamping mechanisms than the second position.

The belt splicing tool is used by (i) positioning the clamps so as to provide a first longitudinal gap between the clamps, (ii) placing an end of a thermoplastic belt in each clamping mechanism with the ends facing each other and extending into the longitudinal gap, (iii) melting the end portions of the clamped belt ends, and (iv) repositioning the clamps towards a closed position so as to decrease the longitudinal gap between the clamps and thereby contact the melted belt ends until the melted portion solidifies and bonds the belt ends together.

DETAILED DESCRIPTION OF THE INVENTION

Definitions

As utilized herein, including the claims, the phrase "longitudinal gap", when used in connection with the clamping mechanisms, refers to the longitudinal length of the void space between the facing surfaces of the clamping mechanisms into which the belt ends are extended and a heating surface is inserted during normal use of the tool.

As utilized herein, including the claims, the phrase "remote location", when used to describe the positioning means, indicates that the clamping mechanisms may be repositioned by exerting repositioning force at least 10 cm away from any portion of either clamping mechanism.

Nomenclature

Figure 1:
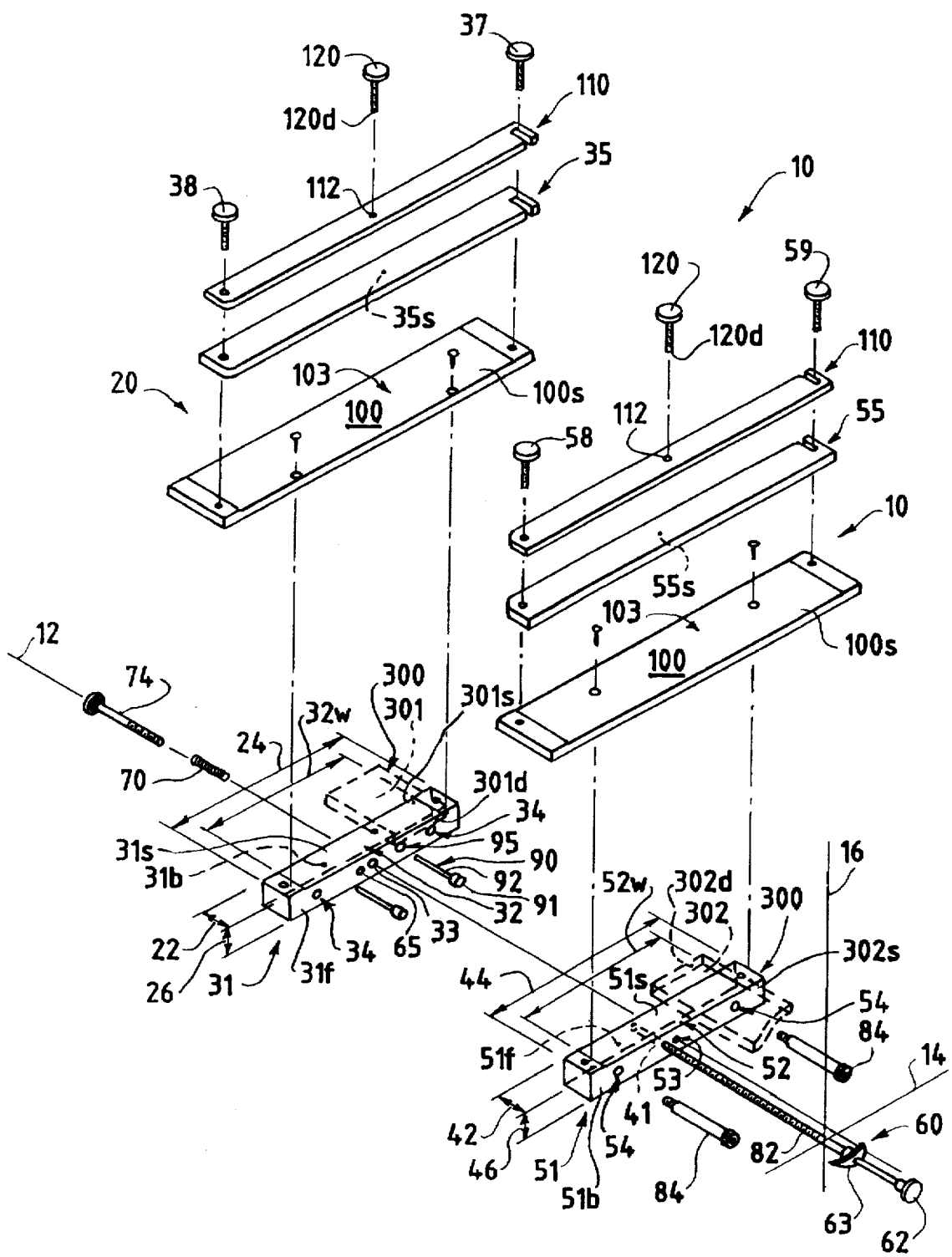
FIG. 1 is an exploded perspective view of one embodiment of a belt splicing tool according to the present invention.

10 Belt Splicing Tool
12 Longitudinal Axis
14 Lateral Axis
16 Transverse Axis
20 First Clamping Mechanism
22 Width of First Clamping Mechanism
24 Length of First Clamping Mechanism
26 Height of First Clamping Mechanism
31 First Base Element
31b Back Surface of First Base Element
31f Front Surface of First Base Element
31s First Major Surface of First Base Element
32 First Channel
32w Width of First Channel
33 Longitudinal Central Orifice Through First Base Element
34 Longitudinal Side Orifices in First Base Element
35 First Retention Element
35s First Major Surface of First Retention Element
38 First Clamping Means (First Clamping Bolt)
39 First Clamping Means (Second Clamping Bolt)
40 Second Clamping Mechanism 41 Longitudinal Hole Through Second Base Element
42 Width of Second Clamping Mechanism
44 Length of Second Clamping Mechanism
46 Height of Second Clamping Mechanism
51 Second Base Element
51$b$ Back Surface of Second Base Element
51$f$ Front Surface of Second Base Element
51$s$ First Major Surface of Second Base Element
52 Second Channel
52$w$ Width of Second Channel
53 Longitudinal Central Orifice in Second Base Element
54 Longitudinal Side Orifices in Second Base Element
55 Second Retention Element
55$s$ First Major Surface of Second Retention Element
58 Second Clamping Means (Third Clamping Bolt)
59 Second Clamping Means (Fourth Clamping Bolt)
60 Position Control Means
62 End Knob
63 Wings
65 Dimple in Front Surface of First Base Element
70 Biasing Means (Spring)
74 Spring Tensioning Shoulder Bolt
82 Central Shaft
84 Side Shoulder Bolts
90 Locking Mechanism (Offset Spacer Pin)
91 Head of Spacer Pin
92 Shaft of Spacer Pin
92$d$ Diameter of Shaft
95 Longitudinal Passage Through First Base Element
100 Adaptor Plate
100$s$ First Major Surface of Adaptor Plate
103 Third Channel
110 Restraining Plate
112 Central Threaded Orifice
120 Pressure Bolt
120$d$ Distal End of Pressure Bolt
300 Belt
301 First End Section of a Thermoplastic Belt
301$s$ Side Edge of First End Section
301$d$ Longitudinal End of First End Section
302 Second End Section of a Thermoplastic Belt
302$s$ Side Edge of Second End Section
302$d$ Longitudinal End of Second End Section Construction The belt splicing tool 10, shown in FIG. 1, comprises a first clamping mechanism 20, a second clamping mechanism 40, and a position control means 60. The clamping mechanisms 20 and 40 are cooperatively engaged and diametrically opposed along a longitudinal axis 12. The tool 10 may also include a biasing means and a locking mechanism 90.

Each clamping mechanism 20 and 40 has (i) a width 22 and 42 measured along the longitudinal axis 12, (ii) a length 24 and 44 measured along a lateral axis 14 orthogonal to the longitudinal axis 12, and (iii) a height 26 and 46 measured along a transverse axis 16 orthogonal to both the longitudinal axis 12 and the lateral axis 14. The first clamping mechanism 20 is configured and arranged for holding a first end section 301 of a belt 300 and the second clamping mechanism 40 is configured and arranged for holding a second end section 302 of a belt 300. These belt end sections 301 and 302 may be opposite ends of the same length of belt 300 or may be ends of two different lengths of belt 300. When belt end sections 301 and 302 are opposite ends of the same length of belt 300, the resultant spliced product is an endless belt 300. When belt end sections 301 and 302 are the ends of two different lengths of belt 300, the resultant spliced product is a longer composite length of belt 300.

The first clamping mechanism 20 includes a first base element 31 having a first major surface 31$s$ and a first retention element 35 having a first major surface 35$s$. The first major surface 31$s$ of the first base element 31 is configured to define a first channel 32 with a first width 32$w$ effective for accommodating the first belt end section 301. The first clamping mechanism 20 also includes a first clamping means which connects the first base element 31 and first retention element 35 and operates to force the first base element 31 against the first retention element 35 so as to securely grip and hold a first belt end section 301 positioned within the first channel 32 between the first major surface 35$s$ of the first retention element 35 and the first major surface 31$s$ of the first base element 31. As shown in FIG. 1, finger-tightenable bolts 38 and 39 are effective first clamping means with the first retention element 35 designed to pivot about bolt 38 and be latched into position by bolt 39. Examples of other suitable clamping means include latches, springs, elastic bands, wing nuts, pawl and ratchet systems, pressure plates, pneumatic and other methods known in the art. In addition, industrial mechanisms such as pneumatic, hydraulic, and other powered systems could also be employed.

The second clamping mechanism 40 mirrors the first clamping mechanism 20. The second clamping mechanism 40 includes a second base element 51 having a first major surface 51$s$ configured to define a second channel 52 having a width 52$w$ effective for accommodating the second belt end section 302. The width 52$w$ of the second channel 52 may be the same or different than the width 32$w$ of the first channel 32. As with the first clamping mechanism 20, the second clamping mechanism 40 includes a second retention element 55 having a first major surface 55$s$. A second clamping means, as described in connection with the first clamping mechanism 20, is included for securely gripping and holding a second belt end section 302 positioned within the second channel 52 between the first major surface 51$s$ of the second base element 51 and the first major surface 55$s$ of the second retention element 55. The second clamping means may be any of the types described in connection with the first clamping means. FIG. 1 shows finger tightenable bolts 58 and 59 with the second retention element 55 designed to pivot about bolt 58 and be latched into position by bolt 59.

The position control means 60 is capable of repetitively repositioning the clamping mechanisms 20 and 40 relative to one another in a linear fashion along the longitudinal axis 12. The position control means 60 is effective in a first mode for placing the clamping mechanisms 20 and 40 in a first position and effective in a second mode for placing the clamping mechanisms 20 and 40 in a second position wherein the first position provides a smaller longitudinal gap between the clamping mechanisms 20 and 40 than the second position. The clamping mechanisms 20 and 40 have a continuous range of motion along the longitudinal axis 12 between the first position and the second position with the position control means 60 capable of being designed to provide a plurality of intermediate modes effective for placing the clamping mechanism 20 and 40 in an intermediate position between the first and second positions.

As shown in FIG. 1, one embodiment of a position control means 60 is a piston [not shown] slidably engaged through a longitudinally extending hollow central shaft 82. The shaft 82 is attached to the second base element 51 as it extends completely through a longitudinal hole 41 in the second base element 51. The distal end [not shown] of the piston [not shown] longitudinally extends from the front surface 51f of the second base element 51 while the proximal end [not shown] of the piston [not shown] extends a substantial distance from the back surface 51b of the second base element 51. An end knob 62 is attached to the proximal end [not shown] of the piston [not shown] which, in combination with wings 63 extending abaxially from the proximal end of shaft 82, provide a means for manually actuating the piston [not shown]. When the end knob 62 is moved relative to wings 63, the piston [not shown] slides inside of shaft 82 so as to extend the distal end [not shown] of the piston [not shown] beyond the back surface 51b of the second base element 51. The extended distal end [not shown] of the piston [not shown] pushes against the front surface 31f of the first base element 31 and thereby separates the clamping mechanisms 20 and 40. A conical dimple 65 is provided in the front surface 31f of the first base element 31 where the distal end [not shown] of the piston [not shown] strikes the first base element 31 in order to prevent the piston [not shown] from being abaxially deflected from the desired longitudinal motion of the piston [not shown].

The biasing means 70 serves to bias the clamping mechanisms 20 and 40 towards a rest position. The rest position can be either the first position (such that an activating force is required to reach and hold the second position), the second position (such that an activating force is required to reach and hold the first position) or an intermediate position. In the embodiment shown in FIG. 1, the clamping mechanisms 20 and 40 are biased towards the first position by a compression spring 70 which pushes the first base element 31 towards the second base element 51. The spring 70 is slipped over the shaft (unnumbered) of a spring tensioning shoulder bolt 74 which slidably extends through a longitudinal central orifice 33 in the first base element 31 and is threadably engaged within a longitudinal central orifice 53 in the front surface 51f of the second base element 51. The spring 70 is compressed between the head of the spring tensioning shoulder bolt 74 and the back surface 31b of the first base element 31. The spring tensioning shoulder bolt 74 can control the force exerted by the compression spring 70 (i.e., extent to which the spring 70 is compressed) by simply increasing or decreasing the length of spring tensioning shoulder bolt 74 threaded into the second base element 51. A biasing spring similar to spring 70 can also be operably positioned onto the shafts (unnumbered) of one or both of the side shoulder bolts 84 and positioned between the heads (unnumbered) of the side shoulder bolts 84 and the back surface 51b of the second base element 51 or between the front surface 51f of the second base element 51 and the front surface 31f of the first base element 31. The extent and direction of bias provided by such spring(s) depends upon both its position relative to the second base element 51 and whether the spring is a compression or extension spring.

A spacer pin 90 extends through a longitudinal passage 95 in the first base element 31. The spacer pin 90 has a cylindrical head 91 positioned proximate the front surface 31f of the first base element 31 and a shaft 92 which longitudinally extends from back surface 31b of the first base element 31. The diameter of the head 91 is substantially larger than the diameter of the shaft 92. The diameter of the longitudinal passage 95 is greater for that portion proximate the front surface 31f of the first base element 31 so as to accommodate the entire head 91 of the spacer pin 90. The length of longitudinal passage 95 proximate the back surface 31b of the first base element 31 is sized to permit passage of the shaft 92 but prevent passage of the head 91. This smaller diameter portion of the passage 95 is configured and arranged relative to the larger diameter portion of the passage 95 so as to permit lateral and/or transverse movement of the pin head 91 relative to the passage 95 such that the pin head 91 may be abaxially offset from the passage 95 and thereby prevent the clamping mechanisms 20 and 40 from reaching the first position due to the presence of the pin head 91 between the front surfaces 31f and 51f of the base elements 31 and 51. This abaxial movement can be facilitated by (i) longitudinally offsetting the smaller diameter portion of the passage 95 relative to the larger diameter portion, and/or (ii) providing sufficient lateral and/or transverse spacing between the pin shaft 92 and the walls of the smaller diameter portion of the passage 95 such that the spacer pin 90 may be laterally and/or transversely angled from the longitudinal axis 12.

Stated in more general terms—applicable to this invention—the spacer pin 90 does not interfere with biasing of the clamping mechanisms 20 and 40 towards the first position when the spacer pin 90 is in a rest position (i.e. pin head 91 is retained within the larger diameter portion of the passage 95) but maintains the clamping mechanisms 20 and 40 in an active position, against the force exerted by the biasing means 70, when in an active position (i.e. pin head 91 is abaxially offset and contacts the front surfaces 31f and 51f of the base elements 31 and 51 prior to the base elements 31 and 51 reaching the second position). The active position is generally a position intermediate the first and the second positions.

The clamping mechanisms 20 and 40 are slidably engaged in the longitudinal direction 12 and fixedly engaged in both the lateral 14 and transverse 16 directions by an engaging means. The engaging means maintains the clamping mechanisms 20 and 40 aligned in the lateral 14 and transverse 16 directions while permitting the clamping mechanisms 20 and 40 to be repetitively repositioned along longitudinal axis 12. An effective engaging means, shown in FIG. 1, is a pair of laterally spaced side shoulder bolts 84 which slidably extend through longitudinal side orifices 54 in the second base element 51 and are threadably engaged within longitudinal side orifices 34 in the front surface 31f of the first base element 31. Other suitable mechanisms include, a track system, interlocking grooved channels, guide planes, and various other techniques known to those skilled in the art.

Figure 2:
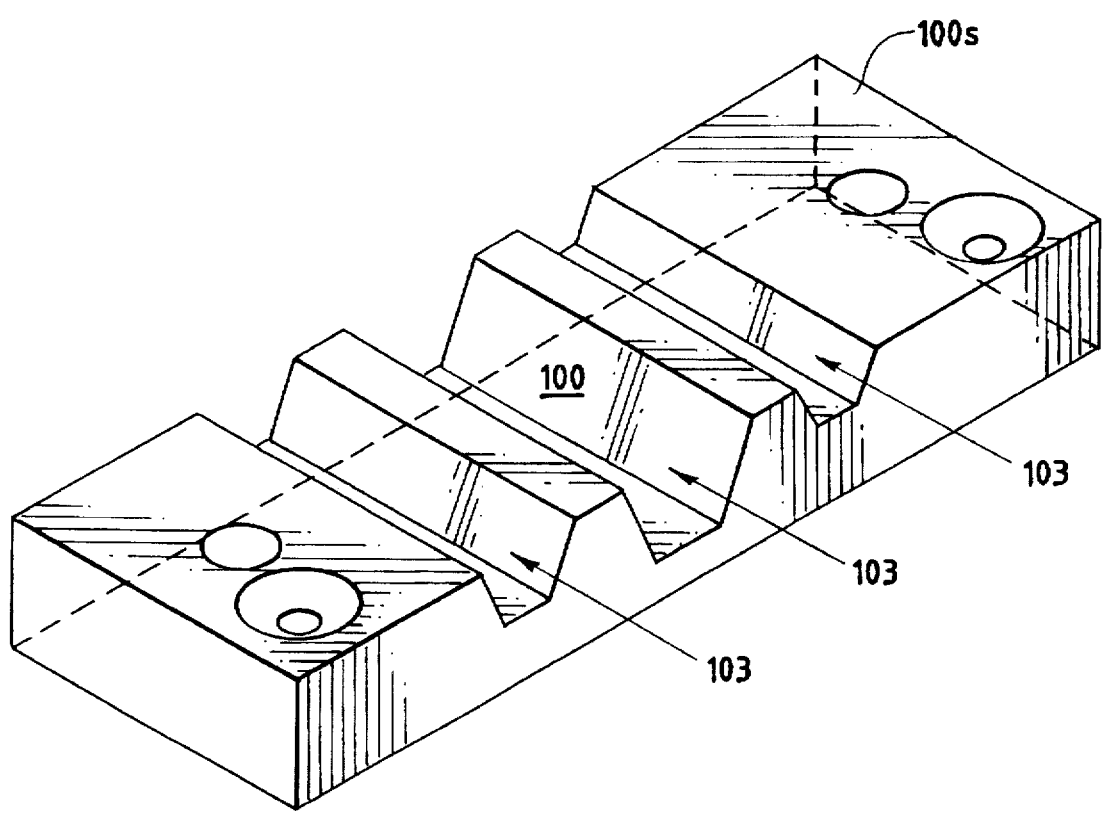
FIG. 2 is a perspective view of an adaptor plate configured with channels capable of accommodating round belts.

The belt splicing tool 10 can be adjusted to handle a variety of belt 300 sizes and shapes by use of an adaptor plate 100. FIG. 1 shows adaptor plates 100 attached to each of the base elements 31 and 51. FIG. 1 shows adaptor plates 100 configured to accommodating wide flat belts 300 while FIG. 2 shows an adaptor plates 100 configured to accommodate round belts 300. It should also be understood that other adaptor plates 100 may be readily configured to accommodate other sizes and shapes. Each adaptor plate 100 has a first major surface 100s which is configured to define a third channel 103 having the desired configuration. The adaptor plate 100 may be readily mounted to the first major surface 31s and 51s of the base elements 31 and 51 by any of a variety of connectors including screws, latches, pegs, roll pins, bolts, etc. The mounted adaptor plates 100 are positioned between the first major surfaces 31s and 51s of the base elements 31 and 51 and the respective retention elements 35 and 55, with the first major surface 100s of the adaptor plate 100 facing the first major surface 35s and 55s of the corresponding retention element 35 and 55. Special retention elements 35 and 55 designed to match the various adaptor plates 100 may be necessary in order to accommodate certain belts 300.

A restraining plate 110 may be optionally included for purposes of increasing the clamping force exerted by the clamping mechanisms 20 and 40. Such additional clamping force is particularly desired for belt 300 widths greater than about six inches. Referring to FIG. 1, a suitable restraining plate 110 is positioned over the retention element 35 and 55 and secured at both lateral ends by the same finger tightenable bolts 38, 39, 58 and 59 which secure the retention elements 35 and 55 to the adaptor plate 100 or the base elements 31 and 51. The restraining plate 110 includes a central threaded orifice 112 through which a pressure bolt 120 may the threadably engaged. Rotation of the pressure bolt 120 in a clockwise fashion causes the distal end 120d of the pressure bolt 120 to extend further away from the restraining plate 110 and force the center of the retention elements 35 and 55 to deflect away from the restraining plate 110 and towards the base elements 31 and 51.

The individual components of the belt splicing tool 10 can be manufactured using metal fabrication methods known in the art. The belt splicing tool 10 can be made from any material capable of withstanding the heat and clamping forces applied during use. Suitable materials include metals thermoset plastics, ceramics and wood.

Use

The belt splicing tool 10 may be used to join the ends of substantially any thermoplastic belt 300. The belt splicing tool 10 is effective for connecting a first belt end section 301 and a second belt end section 302 of at least one thermoplastic belt 300. When the tool 10 is used to join the ends of a single endless belt 300, the operator must first determine the required belt 300 length and then cut and/or splice the desired length from the lengths of belt 300 in stock—preferably with squared ends. In the case of stretchable belts 300 that need to operate within certain tensions parameters, the belt 300 should be cut a fraction shorter than the desired length. Elastic belts 300 are typically reduced five to six percent in length to achieve the desired tension. High shock load areas often require an even higher decrease (up to eight percent) to achieve optimal tension.

Use of the tool 10 to splice two belt end sections 301 and 302 first requires that belt end sections 301 and 302 be secured and aligned within the clamping mechanisms 20 and 40. This is accomplished by: (i) depressing end knob 62 so as to actuate the piston [not shown] and separate the clamping mechanisms 20 and 40 a sufficient distance to allow abaxial repositioning of the spacer pin 90, (ii) extending the head 91 of the spacer pin 90 into the longitudinal gap between the clamping mechanisms 20 and 40 and abaxially offsetting the spacer pin 90, (iii) releasing the end knob 62 so as to permit the biasing spring 70 to force the clamping mechanisms 20 and 40 towards each other until the head 91 of the spacer pin 90 is sandwiched between the base elements 31 and 51 and holds the clamping mechanisms 20 and 40 in an intermediate separated position, (iv) loosening bolts 38, 39, 58, and 59, (v) pivoting retention elements 35 and 55 as well as restraining elements 110 about bolts 38 and 58 respectively, (vi) placing a first belt end section 301 into the first channel 32 of the first clamping mechanism 20 by aligning the side edge 301s of the first belt end section 301 with the machined edge (unnumbered) of the first channel 32 and leaving an end portion of the first belt end section 301 protruding from the front surface 31f of the first base element 31 about halfway across the longitudinal gap, (vii) pivoting the first retention element 35 and restraining element 110 back into position over the first base element 31 and tightening bolts 38 and 39 as well as pressure bolt 120 until the first belt end section 301 is securely retained within the first clamping mechanism 20, (viii) placing a second belt end section 302 into the second channel 52 of the second clamping mechanism 40 by aligning the side edge 302s of the second belt end section 302 with the machined edge (unnumbered) of the second channel 52 and leaving an end portion of the second belt end section 302 protruding from the front surface 51f of the second base element 51 about halfway across the longitudinal gap such that the end of the first 301 and second 302 belt end sections are aligned proximate the center of the longitudinal gap, and (ix) pivoting the second retention element 55 and restraining element 110 back into position over the second base element 51 and tightening bolts 57 and 58 as well as pressure bolt 120 until the second belt end section 302 is securely retained within the second clamping mechanism 40.

Once belt end sections 301 and 302 are secured and aligned within the clamping mechanisms 20 and 40, a portion of the longitudinal ends 301d and 302d of the belt end sections 301 and 302 are melted across substantially the entire cross-sectional area of the belt end 301d and 302d. A preferred method of melting the belt ends 301d and 302d includes: (x) separating the aligned longitudinal ends 301d and 302d of the belt end sections 301 and 302 by depressing end knob 62 and actuating the piston [not shown], (xi) placing a heated wand between the separated belt ends 301d and 302d, (xii) repositioning the spacer pin 90 into alignment with the passage 95 so that it does not interfere with biasing of the clamping mechanisms 20 and 40 into the second position, (xiii) releasing end knob 62 slowly until the longitudinal ends 301d and 302d of both belt end sections 301 and 302 contact the heated wand and melt across substantially the entire cross-sectional surface of the longitudinal ends 301d and 302d.

The splicing is completed by pressing the melted belt ends 301d and 302d together until the melted portions solidify. This is done by (xiv) separating the melted longitudinal ends 301d and 302d of the belt end sections 301 and 302 from the heated wand by depressing end knob 62 and actuating the piston [not shown], (xv) removing the wand from between the clamping mechanisms 20 and 40, (xvi) releasing end knob 62 so as to permit the biasing spring 70 to push the clamping mechanisms 20 and 40 together until the melted belt ends 301d and 302d abut, and (xvii) allowing the melted belt ends 301d and 302d to remain pressed together until the melted portions of the belt ends 301d and 302d solidify and form an effective splice of belt end sections 301 and 302. The belt ends 301d and 302d should remain in the same plane when the biasing spring 70 pushes the ends 301d and 302d together. Deflection of the ends 301d and 302d out from the plane defined by the clamped belt end sections 301 and 302 can be eliminated by reducing the force exerted by the biasing means 70, such as by backing the spring tensioning shoulder bolt 74 out from the second base element 51.

Splicing of the belt end section 301 and 302 is completed by (xviii) removing the belt end sections 301 and 302 from clamping mechanisms 20 and 40 by (a) loosening bolts 38, 39, 58 and 59, (b) pivoting retention elements 35 and 55 as well as restraining plates 110 away from bolts 39 and 59; and finally (xix) trimming any excess flashing or residue from along the splice line.

This innovative belt splicing system 10 makes belt 300 installations and repair much less burdensome to maintenance and production personnel. The belt splicing tool 10 is not limited to conveyor belts 300 and can be used to join any thermoplastic belt ends 301d and 302d regardless of application.

The invention is not to be taken as limited by all of the details described herein. Various modifications and variations thereof may be made without departing from the spirit or scope of the invention.

What is claimed is:

1. A belt splicing tool for joining first and second belt ends comprising:

a) first and second clamping mechanisms cooperatively engaged and diametrically opposed along a longitudinal axis, wherein:
      i) each clamping mechanism has (A) a width measured along the longitudinal axis, (B) a length measured along a lateral axis orthogonal to the longitudinal axis, and (C) a height measured along a transverse axis orthogonal to both the longitudinal and the lateral axes; (ii) the first clamping mechanism is configured and arranged for holding a first end section of a belt; and (iii) the second clamping mechanism is configured and arranged for holding a second end section of a belt;

b) a position control means effective for repetitively repositioning the clamping mechanisms relative to one another in a linear fashion along the longitudinal axis between a first position and a second position wherein the first position provides a smaller longitudinal gap between the clamping mechanisms than the second position; and c) a means for biasing the clamping mechanisms in favor of the first position.

2. The belt splicing tool of claim 1, wherein the tool further includes a spacer means operable in a first mode for maintaining the clamping mechanisms in a longitudinal position intermediate the first and second positions against the force exerted by the biasing means, and operable in a second mode for passively allowing the biasing means to bias the clamping mechanisms.

3. The belt splicing tool of claim 2, wherein the spacer means automatically converts from the first mode to the second mode when the positioning means is actuated to reposition the clamping mechanisms from the intermediate position towards the second position.

4. The belt splicing tool of claim 1, further including a means for cooperatively connecting the first and second clamping mechanisms comprising at least one longitudinally extending guide element fixedly engaged to one of the clamping mechanisms and slidably engaged to the other clamping mechanism for operably aligning the clamping mechanisms along the longitudinal axis.

5. The belt splicing tool of claim 4 wherein the cooperative engagement means comprises at least two longitudinally extending guide elements fixedly engaged to one of the clamping mechanisms and slidably engaged to the other clamping mechanism for operably aligning the clamping mechanisms along the longitudinal axis.

6. The belt splicing tool of claim 1, wherein the first position provides a longitudinal gap between the clamping mechanisms of about 0 to about 2 cm and the second position provides a longitudinal gap between the clamping mechanisms of about 1 to about 5 cm.

7. A belt splicing tool for joining first and second belt ends comprising:

a) first and second clamping mechanisms cooperatively engaged and diametrically opposed along a longitudinal axis, wherein:
      i) each clamping mechanism has (A) a width measured along the longitudinal axis, (B) a length measured along a lateral axis orthogonal to the longitudinal axis, and (C) a height measured along a transverse axis orthogonal to both the longitudinal and the lateral axes; (ii) the first clamping mechanism is configured and arranged for holding a first end section of a belt; and (iii) the second clamping mechanism is configured and arranged for holding a second end section of a belt; and b) a position control means effective for repetitively repositioning the clamping mechanisms relative to one another in a linear fashion along the longitudinal axis between a first position and a second position wherein the first position provides a smaller longitudinal gap between the clamping mechanisms than the second position, the position control means being a hand-operable system which permits repositioning of the clamping mechanisms from a remote location, the position control means includes (i) a longitudinally extending hollow sleeve fixedly engaged through one of the clamping mechanisms, (ii) a piston slidably engaged within the hollow sleeve operable for contacting the other clamping mechanism and longitudinally positioning the clamping mechanisms between the first and second longitudinal positions by reciprocation of the piston within the sleeve.

8. A belt splicing tool for joining first and second belt ends comprising:

a) first and second clamping mechanisms cooperatively engaged and diametrically opposed along a longitudinal axis, wherein:
      i) each clamping mechanism has (A) a width measured along the longitudinal axis, (B) a length measured along a lateral axis orthogonal to the longitudinal axis, and (C) a height measured along a transverse axis orthogonal to both the longitudinal and the lateral axes; (ii) the first clamping mechanism is configured and arranged for holding a first end section of a belt; (iii) the second clamping mechanism is configured and arranged for holding a second end section of a belt; (iv) the first clamping mechanism includes (A) a first base element having a first major surface configured to provide a first channel having a first width effective for accommodating a first belt end section, (B) a first retention element having a first major surface, and (C) a means for clamping the first base element and the first retention element together so as to securely retain a first belt end section positioned within the first channel between the first major surfaces of the first base element and the first retention element; and (v) the second clamping mechanism includes (A) a second base element having a first major surface configured to provide a second channel having a second width effective for accommodating a second belt end section, (B) a second retention element having a first major surface, and (C) a means for clamping the second base element and the second retention element together so as to securely retain a second belt end section positioned within the second channel between the first major surfaces of the second base element and the second retention element;

b) a position control means effective for repetitively repositioning the clamping mechanisms relative to one another in a linear fashion along the longitudinal axis between a first position and a second position wherein the first position provides a smaller longitudinal gap between the clamping mechanisms than the second position; and c) an adaptor plate having a first major surface configured to provide a third channel having a third configuration which is different than the channel configurations provided by the first and second base elements; whereby mounting of the adaptor plate between the first major surface of the base element and the corresponding retention element—with the first major surface of the adaptor plate facing the first major surface of the retention element—provides a differently configured channel for retention of a belt end segment.

9. A method for splicing together first and second belt ends comprising:

a) obtaining a first belt end section and a second belt end section wherein each belt end section includes a longitudinal end having a cross-sectional b) obtaining a tool which includes at least:

i) first and second clamping mechanisms cooperatively engaged and diametrically opposed along a longitudinal axis, wherein: (i) each clamping mechanism has (A) a width measured along the longitudinal axis, (B) a length measured along a lateral axis orthogonal to the longitudinal axis, (C) a height measured along a transverse axis orthogonal to both the longitudinal and the lateral axes, and (D) an inner facing surface; (ii) the first clamping mechanism is configured and arranged for holding the first belt and section; and (iii) the second clamping mechanism is configured and arranged for holding the second belt end section;

ii) a position control means effective for repetitively repositioning the clamping mechanisms relative to one another in a linear fashion along the longitudinal axis between a first position and a second position wherein the first position provides a smaller longitudinal gap between the clamping mechanisms than the second position;

iii) a means for biasing the clamping mechanisms in favor of the first position; and iv) a spacer means operable in a first mode for maintaining the clamping mechanisms in a longitudinal position intermediate the first and second positions against the force exerted by the biasing means, and operable in a second mode for passively allowing the biasing means to bias the clamping mechanisms in favor of the first position;

c) positioning the clamping mechanisms in the second position;

d) securing the first belt and section in the first clamping mechanism and the second belt end section in the second clamping mechanism such that an end portion of each secured belt end section longitudinally protrudes a distance from the inner surface of each clamping mechanism with the belt cross-sectional ends facing one another;

e) melting at least part of the protruding end portion of both belt end sections across substantially the entire surface of the cross-sectional end; and f) repositioning the clamping mechanisms towards the first position so as to abut the melted cross-sectional ends of the belt and sections and maintaining such abutting relationship until the melted belt ends solidify sufficiently to bond the belt end sections together.

10. The method of claim 9 wherein the belt end sections are secured in the clamping mechanisms with the cross-sectional ends of the first and second belt end sections in an opposed abutting relationship.

11. The method of claim 9 further comprising (i) placing the spacer means into the first mode and positioning the clamping mechanisms in the intermediate position after securing the belt end sections in the clamping mechanisms, and (ii) switching the spacer means to the second mode after the protruding end portions of the belt end sections are melted so that the biasing means may force the melted belt end sections together.

12. The method of claim 9, further comprising trimming excess material abaxially squeezed from between the belt ends.

* * * * *